United States Patent
Pichot et al.

(10) Patent No.: US 10,330,516 B2
(45) Date of Patent: Jun. 25, 2019

(54) PROBE HOLDER WITH SPACER

(71) Applicant: KROHNE S.A.S., Romans-sur-Isère (FR)

(72) Inventors: Vincent Pichot, Romans-sur-Isère (FR); Laurent Peigat, Chevrières (FR)

(73) Assignee: KROHNE S.A.S., Romans-sur-Isère (FR)

( * ) Notice: Subject to any disclaimer, the term of this patent is extended or adjusted under 35 U.S.C. 154(b) by 310 days.

(21) Appl. No.: 15/273,911

(22) Filed: Sep. 23, 2016

(65) Prior Publication Data

US 2017/0089747 A1 Mar. 30, 2017

(30) Foreign Application Priority Data

Sep. 25, 2015 (DE) .................. 10 2015 116 273

(51) Int. Cl.
*G01F 23/284* (2006.01)
*G01S 7/02* (2006.01)
*G01D 11/30* (2006.01)

(52) U.S. Cl.
CPC ............ *G01F 23/284* (2013.01); *G01D 11/30* (2013.01); *G01S 2007/027* (2013.01)

(58) Field of Classification Search
CPC .............. G01F 23/284; G01F 23/0023; G01F 23/2928; G01S 13/10; G01S 13/88; G01S 2007/027; G01S 13/32; G01S 13/34; G01S 7/003
USPC ........................................................ 342/124
See application file for complete search history.

(56) References Cited

U.S. PATENT DOCUMENTS

| 6,393,909 | B1* | 5/2002 | Fahrenbach ........... G01F 23/284 333/252 |
| 6,553,830 | B2 | 4/2003 | Fahrenbach et al. |
| 7,009,408 | B2 | 3/2006 | Maier |
| 7,255,002 | B2 | 8/2007 | Gravel et al. |
| 7,467,548 | B2 | 12/2008 | Fredriksson |
| 7,636,059 | B1 | 12/2009 | Edvardsson |
| 8,963,768 | B2 | 2/2015 | Kienzle et al. |
| 9,035,823 | B2 | 5/2015 | Pichot |
| 2004/0046573 | A1* | 3/2004 | Schroth ............... G01F 23/284 324/644 |
| 2006/0225499 | A1* | 10/2006 | Gravel ................. G01F 23/284 73/290 V |

(Continued)

FOREIGN PATENT DOCUMENTS

DE 100 58 026 A1 5/2002
WO 2010/105654 A1 9/2010

*Primary Examiner* — Timothy X Pham
(74) *Attorney, Agent, or Firm* — David S. Safran; Roberts Mlotkowski Safran Cole & Calderon, P.C.

(57) ABSTRACT

A probe holder for a fill level measuring device operating with the radar principle has a holder housing, a signal conductor for guiding emitted and/or received signals and a spacer. The signal conductor is led out of the interior space of the holder housing through an opening of the holder housing into a process side exterior space of the holder housing. The spacer is arranged in the opening of the holder housing and keeps the signal conductor spaced from the holder housing in the opening. The probe holder realizes a seal relative to the process area in a simple, but effective manner in that the spacer is held in the holder housing by a shrink-fit so that a sealed closure is created between the holder housing and the spacer in the shrunken-in state.

9 Claims, 3 Drawing Sheets

(56) References Cited

U.S. PATENT DOCUMENTS

| | | | | |
|---|---|---|---|---|
| 2007/0234796 | A1* | 10/2007 | Tshishiku | G01F 23/241 |
| | | | | 73/290 R |
| 2009/0178478 | A1* | 7/2009 | Reimelt | G01F 23/284 |
| | | | | 73/290 V |
| 2009/0211808 | A1* | 8/2009 | Falk | H01R 13/5216 |
| | | | | 174/667 |
| 2010/0126288 | A1* | 5/2010 | Osswald | G01F 23/00 |
| | | | | 73/866.5 |
| 2015/0276460 | A1* | 10/2015 | Georgescu | G01F 23/284 |
| | | | | 342/124 |
| 2016/0320224 | A1* | 11/2016 | Eriksson | G01F 23/284 |

\* cited by examiner

PROBE HOLDER WITH SPACER

BACKGROUND OF THE INVENTION

Field of the Invention

The invention relates to a probe holder for a fill level measuring device operating with the radar principle having a holder housing, having a signal conductor for guiding emitted and/or received signals and having a spacer, wherein the signal conductor is led out of the interior space of the holder housing through a wherein opening of the holder housing into the process side exterior space of the holder housing, wherein the spacer is arranged in the opening of the holder housing and keeps the signal conductor spaced from the holder housing in the opening.

Description of Related Art

Fill level measuring devices that operate using the radar principle are used for measuring fill levels in containers such as, for example, tanks or silos. Often, so-called guided radar systems tare used here, which are based on the principle of time domain reflectometry (TDR); the probe holders mentioned in the introduction are of interest for such devices. As opposed to the so-called freely radiating radar systems, electromagnetic signals are generated here by an electronics assembly, fed into a probe and guided along the probe in the direction of the medium whose fill level is to be measured. The extension of the probe defines the measuring range of the fill level measuring device. During operation, the probe extends at least partially into the medium. The end of the probe coming into contact with the medium is usually designed as a free end, however, it can be attached to the floor of the container. Due to an existing jump in the refractive index or, respectively, the permittivity, the signals guided via the probe are at least partially reflected by the surface of the medium when entering the medium and travel back to the electronics assembly on the probe. The fill level of the medium is determined from the running time between emitting the electromagnetic signals and receiving the reflected signals. Usually, very short radio pulses are used as signals.

The principle of time domain reflectometry is, in particular, advantageous because the properties of the medium, for example, density, conductivity and permittivity have little or no influence on measurement. The surrounding conditions, such as pressure and temperature, in the process area also do not influence the measurement results; changing surrounding conditions, like an increasing or decreasing surrounding pressure or an increasing or decreasing surrounding temperature do not affect the measuring accuracy of a TDR fill level measuring device. Measurement using the TDR principle is also suitable for determining separation layer and thus for indicating the overall fill level of the medium, on the one hand, and for indicating the height of the separation layer, on the other hand.

Depending on the field of application, different probe designs are suitable: rod probes or double rod probes have proven advantageous for measuring the fill level of liquids, whereas cable probes have established themselves for fill level measurement of bulk materials.

Depending on the type of medium to be measured or the type of surrounding conditions, i.e., the conditions prevalent in the process area, fill level measuring devices can be exposed to extreme influences. For example, very high pressures or very high temperatures count for such extreme influences. In order to protect the fill level measuring device and, in particular the electronics of the fill level measuring device from the medium and/or the surroundings, it is necessary that the interface between the fill level measuring device and the process area, i.e., for example, the container filled with medium, is sealed. It can also be necessary to design this interface so that it is pressure-resistant and/or diffusion-resistant in terms of explosion protection.

As a guide element for electromagnetic radiation, the probes link, as given by the principle, the process area with its, to some extent, very rough physical surrounding conditions to areas existing in the housing of the measuring device. For example, sensitive electronic components used for generating and coupling the radar signals and designed for receiving and evaluating the electromagnetic reflection signals are housed here. The question of an effective physical separation of the different areas traversed by the probe invariably arises, wherein the probe holder, which is in direct contact to the probe, is of particular importance. On the one hand, the task of probe holders is to securely hold the probe, in particular so that the electromagnetic radiation guided via the probe can pass as undisturbed as possible, in particular without interfering reflections. On the other hand, barriers need to be implemented on and in probe holders for sealing off the interior of the housing from the process area. Solutions are known that usually use a plurality of seals and screw connections, in part with permanent material connections, which often leads to very elaborate construction and mounting procedures and sometimes has the disadvantage that assembled components can no longer be dismantled for maintenance or troubleshooting, at least not without destruction.

SUMMARY OF THE INVENTION

The object of the invention is to provide a probe holder that realizes a seal against the process area in a simple, but effective manner.

The above described and derived object is initially achieved in that the spacer is shrunk in the holder housing so that a sealed closure is created between the holder housing and the spacer in the shrunken state. Thus, a sealed closure between the holder housing and the spacer is implemented in a very simple manner without using sealing elements. This has the advantage that—since there is no need for a separate sealing element—there is no wear on sealing elements, which could lead to impairment of a sealing effect. Additionally, the present seal is maintenance-free, mounting of additional parts is no longer necessary. Furthermore, spacer and holder housing no longer have to be prepared for the accommodation of a separate seal, such as the introduction of grooves.

What is to be understood when discussing sealed closures depends on the process area conditions. A sealed closure is implemented such that it is dust-proof and/or liquid-tight and/or gas-tight. Seals can be easily implemented with the shrunken spacer in the holder housing according to the invention, which, for example, fulfills standard requirements for explosion protection.

A particularly preferred design of the probe holder according to the invention is characterized in that at least one seal is arranged between the holder housing and the spacer. The seal is arranged, in particular, between surfaces of the holder housing and of the spacer facing one another that have not been acted upon by a force and pushed together due to the shrinkage. This has the advantage that the seal is not thermally strained during shrinking, since it does not necessarily have to come into contact with a heated surface. This is preferably also implemented so that the seal does not interfere with the actual shrinking, in particular the seal created by shrinkage. Thus, the seal is not located in the area of the sealed contact created by shrinkage between the holder housing and the spacer. In particular, the seal is affixed on the end of the spacer on the interior side of the housing, i.e., on a surface of the spacer that faces the interior space of the holder housing.

The arrangement of this additional, separate seal is primarily an advantage when shrinkage is relaxed or completely suspended during an extreme thermal load of the fill level measuring device. If unpredicted changes of the state in the process area occur, for example, a large increase in temperature, and if the maximum temperature is greater than a critical temperature so that the holder housing expands, this can lead to the spacer no longer being ideally shrunk in the holder housing and thereby the previously achieved tightness being suspended. The additional seal is provided in order to avoid a penetration of the medium into the fill level measuring device or to avoid an influence of the process area conditions on the fill level measuring device, in particular the electronics of the fill level measuring device.

The seal is preferably designed as a graphite seal, in particular as a graphite sealing ring. A seal that is also advantageous is designed as a gold seal, in particular as a gold sealing ring. In a further preferred design, several seals are implemented, in particular two seals, wherein one seal is designed as a graphite sealing ring and a further seal is designed as a gold sealing ring.

A further preferred design of the probe holder according to the invention is characterized in that the holder housing has at least one bar on the process side, that the bar at least partially borders the opening for receiving the spacer and that the bar is formed such that it surrounds the spacer on the process side.

This design is particularly also advantageous in the case, in which the holder housing is heated due to changing surrounding conditions, in particular process area conditions, such that it expands so far that the spacer is no longer in the shrunken state. Depending on the degree of expansion of the holder housing, it is possible that the spacer is no longer held by the holder housing and slides out of the process side opening of the holder housing. The sliding out of the spacer is prevented by the bar that borders the opening, since it is kept in place by the bar. In the case that a seal is affixed at the end of the spacer on the housing side or, respectively, on a surface of the spacer facing the interior space of the holder housing, a sealed closure is maintained between the spacer and the holder housing due to the interaction of the bar and the seal.

The bar can be implemented in different manners. In one design, the bar is designed such that it completely borders the opening for receiving the spacer and completely surrounds the spacer. A design where several bars are provided is also possible, wherein each bar only partially borders the opening. For example, two bars facing one another can be provided. In the case of several bars, the bars are preferably uniformly arranged over the perimeter of the opening.

The bar or bars are formed so that it/they surrounds/ surround the spacer. This can, for example, be implemented in that the bar/bars is/are bent in the direction of the spacer after the spacer has been shrunk.

So far, a sealed closure between the spacer and the holder housing has been discussed. In the probe holder being discussed here, the signal conductor is led out of the interior space of the holder housing through the wherein opening of the holder housing into the wherein exterior space of the holder housing, wherein the spacer is arranged in the opening of the holder housing. In order to completely seal the probe holder from the process area, a particularly preferred design of the probe holder according to the invention is characterized in that the spacer in the shrunken state is compressed such that the signal conductor is pressed in the spacer so that a sealed closure is created between the signal conductor and the spacer. A complete sealing from the process area is implemented with this design, without further auxiliary means or wear-prone parts.

Additionally or alternatively, it is provided in a further design of the probe holder that the spacer is shrunk onto the signal conductor. If this is reasonably possible, i.e., if the temperature-dependent material expansion or contraction is sufficiently large, depends on the material of the spacer. Nevertheless, small shrinking effects can be used in order to support a resulting sealed pressing of the spacer onto the signal conductor. By combining both of these measures, it can be ensured that the force acting radially on the circumference of the spacer due to the shrinking of the spacer in the holder housing and the contraction of the spacer caused by thermal treatment of the spacer work together to create a sealed closure between the spacer and the signal conductor.

When it is said that the probe holder surrounds a signal conductor, then this does not have to be the actual probe. Rather, the signal conductor can be the connecting element between the electronics generating the signals and the probe guiding the signals into the process area. Then, the signals have to be coupled by the signal conductor in the probe. A preferred design of the probe holder according to the invention is characterized in that an adapter is connected to the signal conductor on the process side and is used for receiving a probe. The connection between the signal conductor and the adapter can be implemented in different manners. In a preferred design, the connection between the signal conductor and the adapter is implemented in that the signal conductor has a thread, that the adapter has a corresponding counter-thread and that the adapter is screwed to the signal conductor. Thus, the connection can be produced and disengaged in a simple manner. The probe is connected to the adapter. This can be implemented in that the adapter and the probe are designed as one piece, namely in that the end of the probe facing the probe holder is designed as an adapter.

A further design of the probe holder according to the invention is characterized in that the adapter, and conductor are connected to one another so that the adapter and the spacer form at least one indirect contact surface and one seal is arranged between the adapter and the spacer. If the signal conductor and the adapter are screwed together, then a seal is achieved by screwing tight.

A preferred design of the probe holder according to the invention is characterized in that the holder housing and the signal conductor consist of a metal. Thereby, the holder housing and the signal conductor can be produced using the same metallic material. The holder housing can also consist of a first metal and the signal conductor of a second metal. A further design is characterized in that the spacer consists of an isolator.

Preferably, the signal conductor is produced of one metal having a low thermal expansion coefficient and a high mechanical resilience. Molybdenum is a good choice for this. A metal having a high thermal expansion coefficient, in particular a higher thermal expansion coefficient than the metal used for the signal conductor, is preferably used for the holder housing. For example, nickel alloys, titanium or stainless steel are options for this. The use of a ceramic, such as aluminum oxide, or a plastic, such as Polyether ether ketone (PEEK) or Polytetrafluoroethylene (PTFE), is an option for the spacer.

The probe holder itself can, for example, be attached via a flange on the wall surrounding the process area.

In detail there are different possibilities for designing and further developing the probe holder according to the invention as will be apparent from the description of preferred embodiments in conjunction with the accompanying drawings.

DETAILED DESCRIPTION OF THE INVENTION

Figure 1:
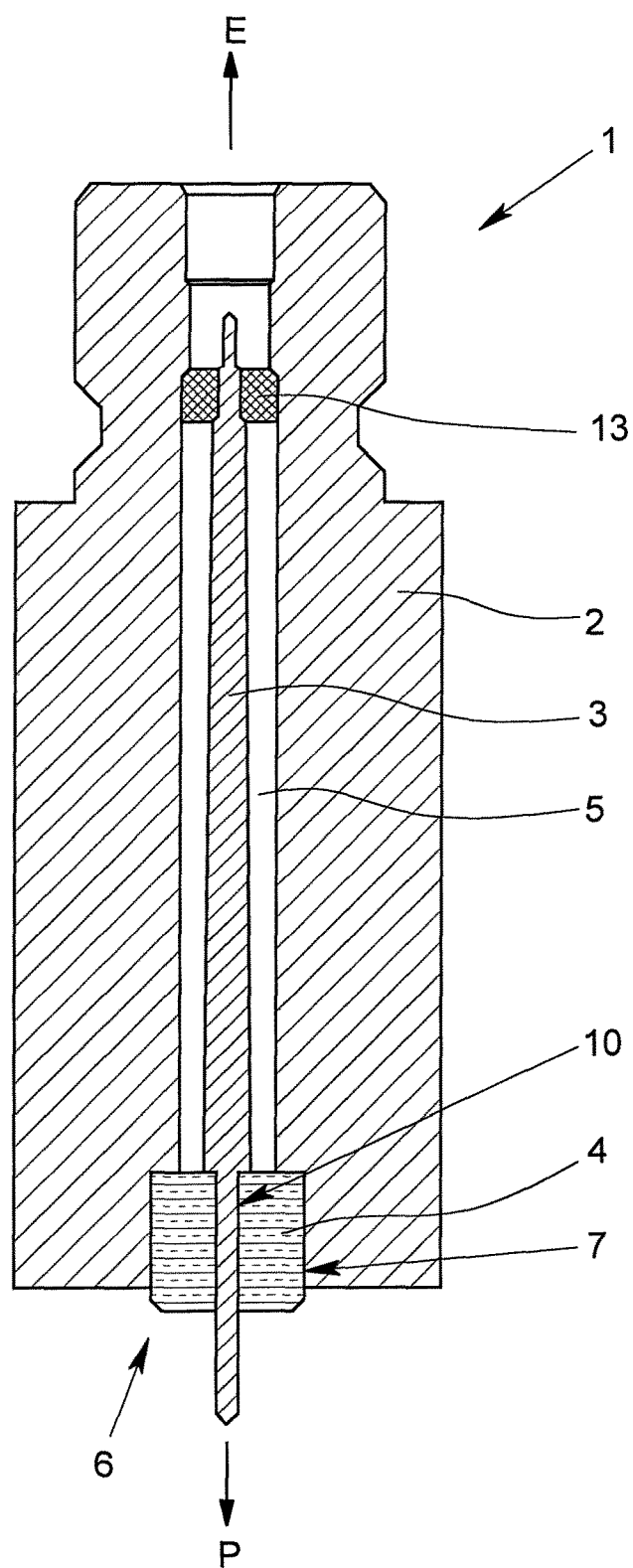
FIG. 1 is a cross-sectional view of a first design of the probe holder according to the invention.

A probe holder 1 according to the invention for a fill level measuring device operating with the radar principle is depicted in FIG. 1. The probe holder 1 comprises a holder housing 2 and a signal conductor 3. The signal conductor 3 is led out of the interior space 5 of the holder housing 2 through a wherein opening 6 of the holder housing 2 into the wherein exterior space. The process side exterior space is not depicted in the form of a closed process area, however is illustrated by the arrow designated with P.

The signal conductor 3 is used for guiding emitted and/or received signals, wherein an emitted signal is generated by conventional electronics that are not shown and are coupled into the signal conductor on the electronics side—indicated by an arrow designated with E. A received signal is coupled into the signal conductor 3 on the process area side and led to electronics implementing an evaluation unit. In order to guide the signals, the signal conductor 3 is formed of a metal.

The holder housing 2 is also made of a metal. A spacer 4, which keeps the signal conductor 3 spaced from the holder housing 2, is arranged in the opening 6 so that the signal conductor 3 does not come into contact with the holder housing 2. The spacer 4 is formed of an electrical isolating material.

The signal conductor 3 is kept spaced from the holder housing 2 on the end of the signal conductor 3 on the electronics side by a second isolating spacer 13. The signal conductor 3 is tapered in the area of the spacers 4 and 13. The tapered ends of the signal conductor 3 are led through recesses of the spacer 4 and the isolator 13, so that the spacers 4 and 13 grip the signal conductor 3 and mount it in the holder housing 2.

In order to protect the electronics from the medium to be measured or in order to protect the electronics from the process area conditions, the housing interior accommodating the electronics has to be sealed relative to the process area P. This is implemented according to the invention in that the spacer 4 is shrunk into the holder housing 2 so that a sealed closure 7 is created between the holder housing 2 and the spacer 4 in the shrunken state. Thus, a maintenance-free seal—maintenance-free because no wear-prone parts such as sealing rings or the like are used that could limit the service life—is implemented in a very simple manner.

The probe holder 1 depicted in FIG. 1 is further characterized in that the spacer 4 is compressed in such a manner in the shrunken state that the signal conductor 3 is pressed into the spacer 4 so that a sealed closure 10 is created between the signal conductor 3 and the spacer 4. In this manner, the probe holder 1 is completely sealed against the process area P.

Figure 2:
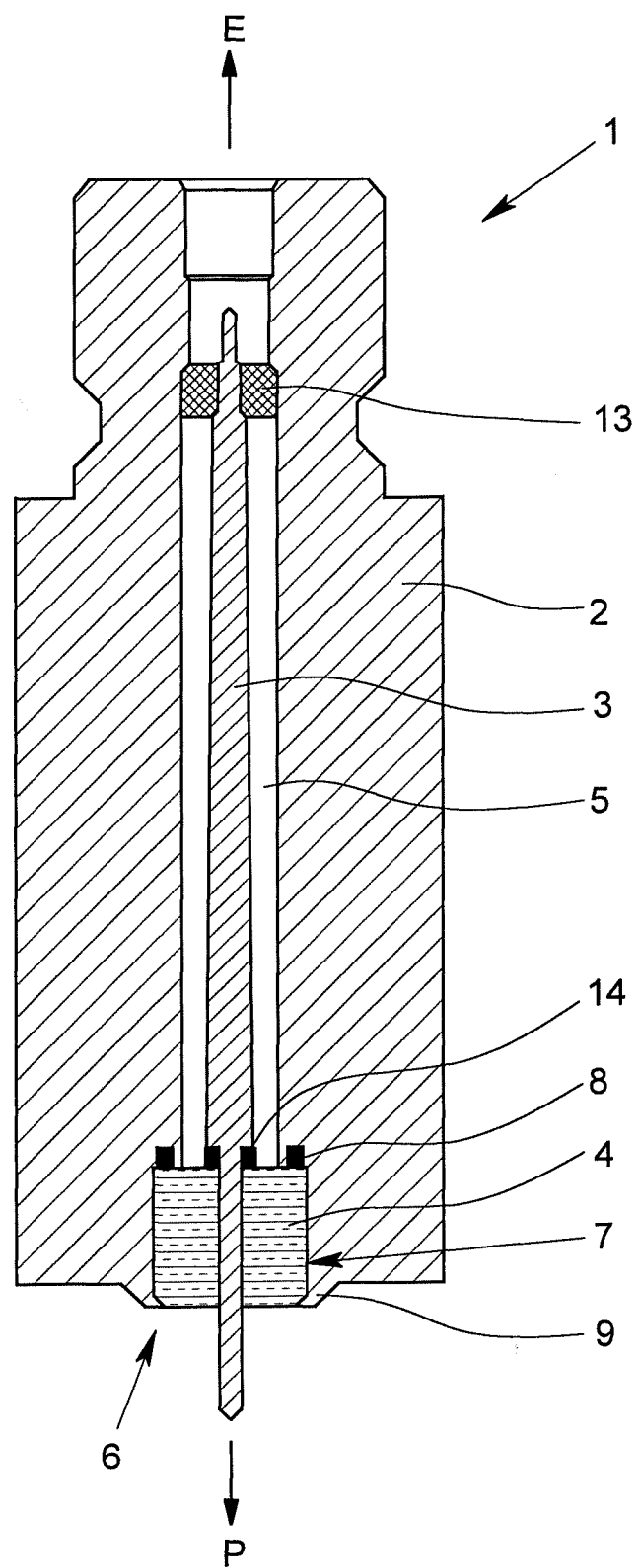
FIG. 2 is a cross-sectional view of a second design of the probe holder according to the invention.

A further design of the probe holder 1 according to the invention is depicted in FIG. 2. The same reference signs designate the same elements. The probe holder 1 depicted in FIG. 2 differs from the probe holder 1 depicted in FIG. 1 in that the signal conductor 3 is not pressed into the holder housing 2 in the shrunken state of the spacer 4. Nevertheless, in order to implement a sealed closure of the probe holder 1 relative to the process area P, a seal 14 is arranged between the signal conductor 3 and the spacer 4. Further, the holder housing 2 has a raised rim 9 on the process side. The raised rim 9 completely borders the opening 6 for receiving the spacer 4 and is formed so that it surrounds the spacer 4 on the process side, being bent over the spacer 4 after it has been inserted. What is not shown, but, however, is preferred, is a design in which the raised rim 9 does not completely border, but rather only partially borders the opening 6 for receiving the spacer 4. The raised rim 9 is then, for example, designed as a lug, wherein several such lugs can be provided. The bar 9 keeps the spacer 4 in place, in case the shrunken state of the spacer 4 is suspended due to unforeseen changes in the process conditions or other interferences. Since, in this case, the sealing effect of shrinkage is also suspended or weakened, a seal 8 is arranged between the holder housing 2 and the spacer 4 on the end of the space 4 on the housing interior side. The seal 8 is implemented as a graphite seal.

Figure 3:
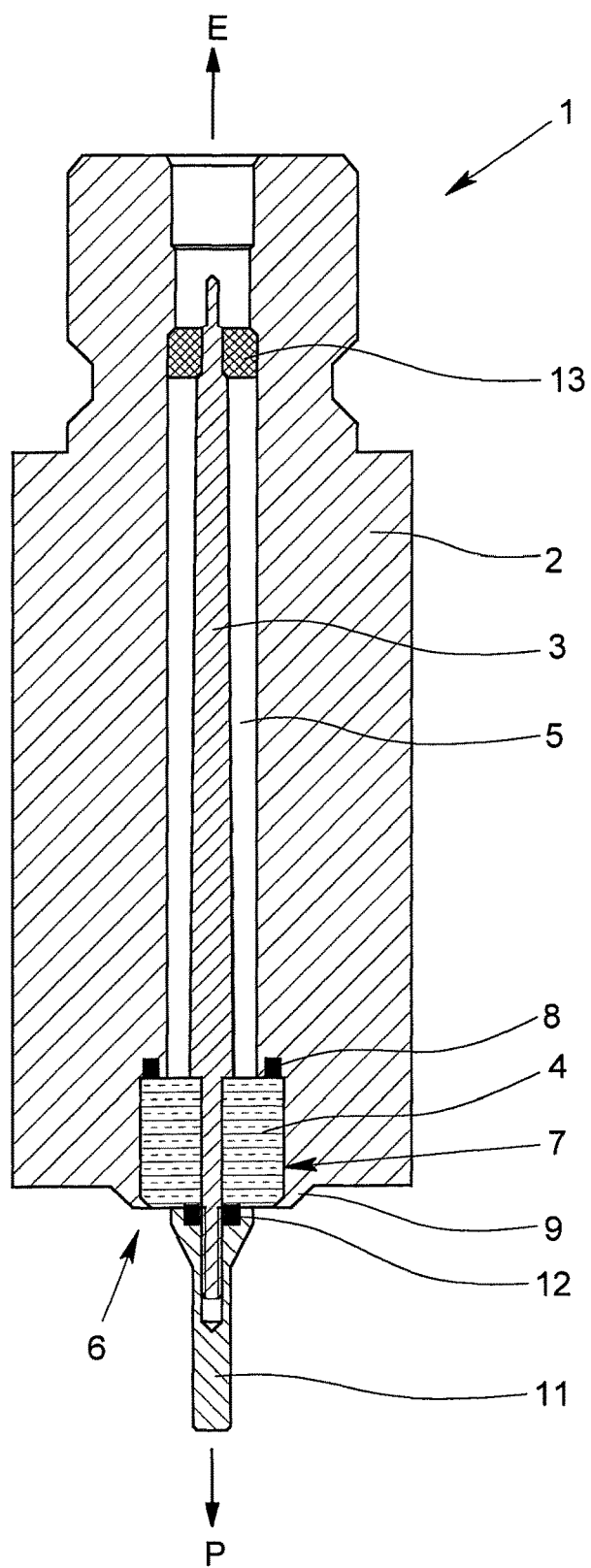
FIG. 3 is a cross-sectional view of a third design of the probe holder according to the invention.

FIG. 3 depicts a further design of the probe holder 1 according to the invention. Again, the same elements have the same reference signs here. In the probe holder 1 shown, a sealed closure 7 is implemented between the holder housing 2 and the spacer 4 in the shrunken state of the spacer 4. For absolute safeguarding, the holder housing 2 has a raised rim 9 on the process side, which completely borders the opening 6 for receiving the spacer 4 and is bent so that it surrounds the spacer 4. A seal 8 is located between the holder housing 2 and the spacer 4 on the end of the spacer 4 on the housing interior side. An adapter 11 is connected to the signal conductor 3 on the process area side, which is used for receiving a probe that is not shown. The signal conductor 3 has a thread, the adapter 11 has a corresponding counter-thread so that the adapter 11 is screwed onto the signal conductor 3. A seal 12 is arranged between the adapter 11 and the spacer 4 in order to implement a sealed closure. The seal 12 achieves its sealing effect by screwing the adapter 13 and the signal conductor 3 together, whereby the seal 12 is held between the spacer 4 and the adapter 11.

What is claimed is:

1. A probe holder for a fill level measuring device operating with a radar principle, comprising:
   a holder housing having interior space,
   a signal conductor for guiding emitted and/or received signals, and
   a spacer,
   wherein the signal conductor is led out of the interior space of the holder housing through an opening of the holder housing into a process side exterior space of the holder housing,
   wherein the spacer is arranged in the opening of the holder housing and keeps the signal conductor spaced from the holder housing in the opening, and wherein the spacer is shrunken into the holder housing so that a sealed closure is created within the opening by a shrink-fit connection between the holder housing and the spacer, wherein at least one spacer seal is between the housing and the spacer.

2. A probe holder for a fill level measuring device operating with a radar principle, comprising:
a holder housing having interior space,
a signal conductor for guiding emitted and/or received signals, and
a spacer,
wherein the signal conductor is led out of the interior space of the holder housing through an opening of the holder housing into a process side exterior space of the holder housing,
wherein the spacer is arranged in the opening of the holder housing and keeps the signal conductor spaced from the holder housing in the opening,
wherein the spacer is shrunken into the holder housing so that a sealed closure is created within the opening by a shrink-fit connection between the holder housing and the spacer,
wherein the holder housing has at least one raised rim on the process side, wherein the raised rim at least partially borders the opening for receiving the spacer and wherein the raised rim is surrounds the spacer on the process side,
wherein a seal is provided between the housing and the spacer, and
wherein the seal is a graphite or gold seal.

3. The probe holder according to claim 1, wherein the spacer in the shrink-fit state is compressed such that the signal conductor is pressed by the spacer so that press-fit sealed closure is created between the signal conductor and the spacer.

4. The probe holder according to claim 1, wherein a shrink-fit of the spacer onto the signal conductor is provided so that a sealed closure is created between the signal conductor and the spacer.

5. The probe holder according to claim 1, wherein an adapter is connected on an end of the signal conductor on the process side for receiving a probe.

6. The probe holder according to claim 5, wherein the signal conductor has a thread, wherein the adapter has a corresponding counter-thread, and wherein the adapter is screwed onto the signal conductor.

7. The probe holder according to claim 5, the adapter and the signal conductor are connected to one another such that the adapter and the spacer form at least an indirect contact surface and wherein a seal is arranged between the adapter and the spacer.

8. The probe holder according to claim 1, the holder housing and the signal conductor are formed of a metal.

9. The probe holder according to claim 8, wherein the spacer is formed of an electrical isolator material.

* * * * *